Apr. 24, 1923.

L. J. B. FOURNIAUD

RIM FOR WHEELS OF VEHICLES

Filed Aug. 24, 1921

1,452,831

INVENTOR
LÉON JEAN BAPTISTE FOURNIAUD.
PER
HIS ATTORNEYS.

Patented Apr. 24, 1923.

1,452,831

UNITED STATES PATENT OFFICE.

LÉON JEAN BAPTISTE FOURNIAUD, OF MARSEILLE, FRANCE.

RIM FOR WHEELS OF VEHICLES.

Application filed August 24, 1921. Serial No. 494,780.

(GRANTED UNDER THE PROVISIONS OF THE ACT OF MARCH 3, 1921, 41 STAT. L., 1313.)

*To all whom it may concern:*

Be it known that I, LÉON JEAN BAPTISTE FOURNIAUD, a citizen of the Republic of France, residing at Marseille, in the Republic of France, have invented certain new and useful Improvements in and Relating to Rims for Wheels of Vehicles (for which I have filed application in France Nov. 30, 1916, Patent No. 486,288), of which the following is a specification.

This invention relates to tired rims of vehicle wheels of the kind which can be contracted and expanded in diameter to facilitate removal and replacement of a tire.

A vehicle rim is known having side flanges one of which may be removable if desired, and having its circumference for a distance of not more than half provided with a depression or groove for the reception of over-lapping plates which are expansible to take up the normal circular periphery of the inner portion of the rim, the expansion being produced by means of one or more cams or like devices.

The object of the present invention is to provide an expansible rim structure of the kind referred to which will give a symmetrical expansion from the centre of the wheel, preserving the circular form of the rim to a greater degree than in former known constructions.

According to the present invention in a rim of the above kind there is provided an expansible and contractible ring, formed of a plurality, preferably four, segments with overlapping ends, said ring being concentric with a tire holding ring and springs being mounted in the annular space between the rings. The diameter variation of said expansible ring may be effected by means of cams in such a manner that the expansion is symmetrical from the centre of the wheel.

This invention is more particularly described in the accompanying drawings, in which an example of rim construction in accordance therewith is shown.

Figure 1:
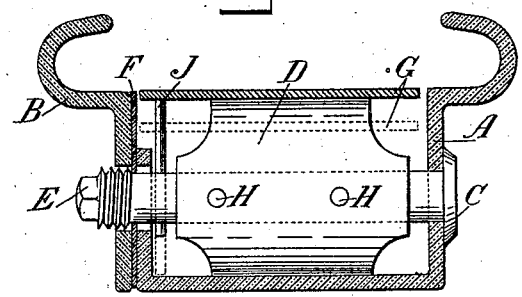

Figure 1 is a vertical transverse section of the rim, and

Figure 2:
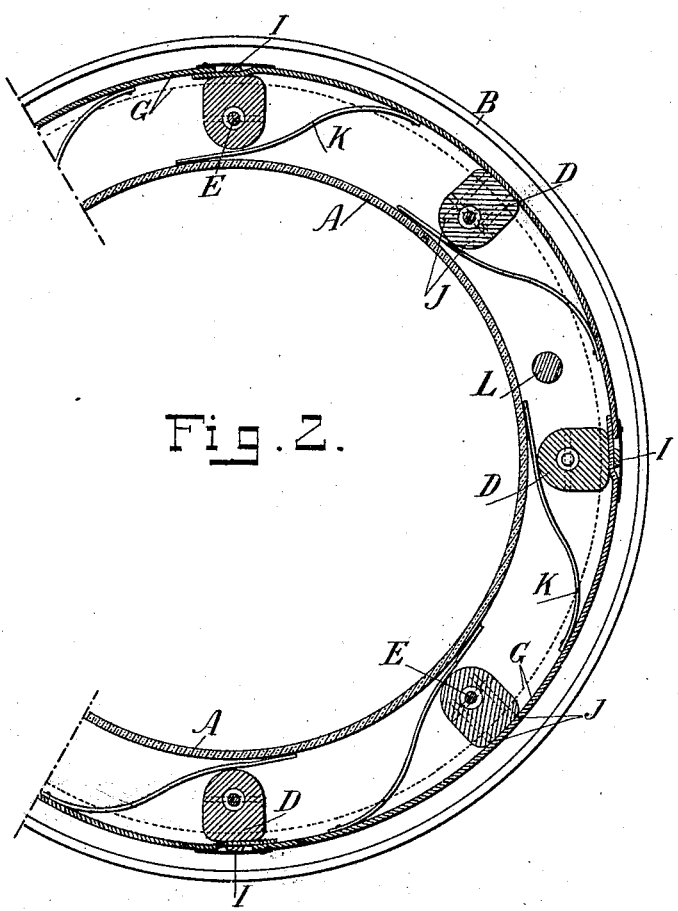

Figure 2 a longitudinal, vertical section of the rim on a reduced scale.

The rim consists of a base A, one flange of which is cut away a little below the head of the bead as shown in Fig. 1. Against this part of the flange a complete flange with its bead B forming an entire ring is placed and is bolted to the part A by bolts C, each bolt having mounted on it a cam D which is arranged in the hollow of the rim A and is fixed on the bolt by rivets H. The bolts C have at one end a squared part E as well as the usual screwthreaded portions. A washer F of leather or other compressible material secured to the part B ensures tightness of the rim. An extensible rim base formed of four segments of a circle G overlapping at each end rests on the cams D and this base increases or diminishes in diameter according as the cams are turned by means of a key acting on the square ends E of the bolts C. Four of these cams are provided with a nipple 1 for locking the ends of the segments G to the bottom of the rim. In the middle of each segment G and beneath it, is riveted a clamp fastening J which passes over four of the bolts C with the object of preventing any circular displacement of the segments. Springs K are riveted to the segments G of the extensible bottom and rest on the fixed bottom of the rim A to maintain a regular separation between the two circular pieces.

To enable the eight bolts to register when the beaded flange B is fitted, two holes are bored in advance in the part B opposite two threaded holes in the piece A so that it suffices to screw two bolts L therein in order to obtain immediately a perfect register or fitting of the two parts A and B.

In order to remove a tire and replace it by another, after having unscrewed the nuts of the bolts C, the diameter of the rim is diminished by turning the cams D a quarter of a revolution by means of a key engaging the bolt ends E. When this has been done, the flange bead B is drawn in and the tire easily removed by hand in view of the facts that the diameter of the rim has been brought to the normal diameter of the tire and there is no longer a flange plate in front of it.

The fresh tire is very easily put in place, then the flange B is reinserted which is facilitated by putting, first, the two bolts L in place; the nuts of the eight bolts are screwed up by hand and then the eight eccentrics are turned a quarter of a revolution in order to bring back the diameter of the base to its original dimensions, after which the eight bolts are thoroughly tightened up and the wheel is ready for use.

The number, shape, dimensions and arrangements of the parts may vary according to circumstance.

I claim:

1. A rim for tired wheels of vehicles, comprising a ring with means for holding one edge of the tire, a second ring with means for holding the other edge of the tire, a plurality of segments arranged with their ends overlapping to form a ring of variable diameter substantially concentric with the tire holding rings, a plurality of springs located in the annular space between the variable diameter ring and the tire holding rings, means for expanding and contracting the variable diameter ring, fastenings extending through the said annular space for uniting the tire holding rings, and means for preventing relative rotation between the variable diameter ring and the tire holding rings.

2. A rim for tired wheels of vehicles, comprising a ring with means for holding one edge of the tire, a second ring with means for holding the other edge of the tire, a plurality of segments arranged with their ends overlapping to form a ring of variable diameter substantially concentric with the tire holding rings, a plurality of springs located in the annular space between the variable diameter ring and the tire holding rings, a plurality of bolts traversing said annular space for uniting the tire holding rings, a plurality of cams mounted on said bolts and adapted to expand and contract the diameter of the variable diameter ring, and means for preventing relative rotation between the last mentioned ring and the tire holding rings.

3. A rim for tired wheels of vehicles comprising, a channeled ring with its side flanges each equipped with a tire holding groove, one of the grooved parts being removable, an expansible base ring occupying the outer perimeter of the channel and consisting of a plurality of segments with overlapping ends, a plurality of plate springs arranged in the channel and tending to hold the base ring in contracted condition, a plurality of bolts traversing the channel and connecting the parts of the channeled ring, a plurality of cams carried by said bolts and adapted to expand and contract the diameter of the base ring when said bolts are turned, and means for preventing relative rotation between the base ring and the channeled ring.

In testimony whereof I affix my signature in presence of two witnesses.

LÉON JEAN BAPTISTE FOURNIAUD.

Witnesses:
   EUGENE DUCASSON,
   SAMUEL G. EBLING.